(12) United States Patent
Väisänen et al.

(10) Patent No.: US 9,524,094 B2
(45) Date of Patent: Dec. 20, 2016

(54) METHOD AND APPARATUS FOR CAUSING DISPLAY OF A CURSOR

(75) Inventors: Matti Mikael Väisänen, Helsinki (FI); Timo-Pekka Olavi Viljamaa, Helsinki (FI); Panu Petri Korhonen, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 331 days.

(21) Appl. No.: 12/851,348

(22) Filed: Aug. 5, 2010

(65) Prior Publication Data

US 2010/0295780 A1 Nov. 25, 2010

Related U.S. Application Data

(63) Continuation-in-part of application No. 12/389,905, filed on Feb. 20, 2009, now abandoned.

(51) Int. Cl.
*G06F 5/08* (2006.01)
*G06F 3/041* (2006.01)
*G06F 3/0488* (2013.01)

(52) U.S. Cl.
CPC ................... *G06F 3/0488* (2013.01)

(58) Field of Classification Search
CPC ............ G06F 3/0488; G06F 2203/04806; G06F 2203/04808
USPC ......... 345/173–183, 157, 156; 715/863, 769, 715/859
See application file for complete search history.

(56) References Cited

U.S. PATENT DOCUMENTS

| | | | |
|---|---|---|---|
| 5,565,888 A | 10/1996 | Selker | |
| 6,073,036 A | 6/2000 | Heikkinen et al. | |
| 6,181,325 B1 | 1/2001 | Lee | |
| 6,335,730 B1 | 1/2002 | Gould | |
| 6,727,892 B1 * | 4/2004 | Murphy | 345/173 |
| 6,816,174 B2 | 11/2004 | Wu et al. | |
| 7,023,428 B2 | 4/2006 | Pihlaja | |

(Continued)

FOREIGN PATENT DOCUMENTS

| | | |
|---|---|---|
| EA | 1947556 A1 | 7/2008 |
| EP | 0653696 B1 | 3/1997 |

(Continued)

OTHER PUBLICATIONS www.flickr.com, printed from the Internet Aug. 11, 2010.

(Continued)

*Primary Examiner* — Kumar Patel
*Assistant Examiner* — Kuo Woo
(74) *Attorney, Agent, or Firm* — Squire Patton Boggs (US) LLP

(57) ABSTRACT

An apparatus, comprising a processor, memory including computer program code, the memory and the computer program code configured to, working with the processor, cause the apparatus to perform at least the following, receive indication of a continuous stroke input associated with a contact region of a touch display, the continuous stroke input comprising at least a first input, and a second input, cause display of a cursor offset from the contact region in response to determining that the first input is a cursor mode initiation input, cause display of cursor to move so that the cursor remains offset from the contact region in response to determining that the second input relates to a movement input, and determine an operation based, at least in part, on position of at least part of a cursor.

19 Claims, 8 Drawing Sheets

(56) References Cited

U.S. PATENT DOCUMENTS

| | | |
|---|---|---|
| 7,239,305 B1 * | 7/2007 | Nakano et al. ............... 345/179 |
| 7,242,387 B2 | 7/2007 | Fitzmaurice et al. |
| 7,268,772 B2 | 9/2007 | Kawai et al. |
| 7,274,377 B2 | 9/2007 | Ivashin et al. |
| 7,956,847 B2 * | 6/2011 | Christie ......................... 345/173 |
| 8,040,319 B2 * | 10/2011 | Heynen et al. ............... 345/156 |
| 8,321,802 B2 * | 11/2012 | Rogers ......................... 715/769 |
| 2002/0015064 A1 | 2/2002 | Robotham et al. |
| 2004/0046796 A1 | 3/2004 | Fujita |
| 2006/0031786 A1 * | 2/2006 | Hillis et al. ................... 715/863 |
| 2006/0036942 A1 | 2/2006 | Carter |
| 2006/0132460 A1 | 6/2006 | Kolmykov-Zotov et al. |
| 2006/0161870 A1 | 7/2006 | Hotelling et al. |
| 2006/0244735 A1 * | 11/2006 | Wilson .......................... 345/173 |
| 2006/0267966 A1 | 11/2006 | Grossman et al. |
| 2007/0097096 A1 | 5/2007 | Rosenberg |
| 2007/0100800 A1 | 5/2007 | Rose et al. |
| 2007/0100883 A1 | 5/2007 | Rose et al. |
| 2007/0262951 A1 | 11/2007 | Huie et al. |
| 2007/0273664 A1 * | 11/2007 | Kim et al. .................... 345/173 |
| 2008/0086703 A1 | 4/2008 | Flynt et al. |
| 2008/0165140 A1 | 7/2008 | Christie et al. |
| 2009/0002326 A1 | 1/2009 | Pihlaja |
| 2009/0044124 A1 | 2/2009 | Pihlaja |
| 2009/0048000 A1 | 2/2009 | Ade-Hall |
| 2009/0288043 A1 * | 11/2009 | Willis ........................... 715/859 |
| 2009/0295720 A1 | 12/2009 | Tseng et al. |
| 2010/0105443 A1 | 4/2010 | Vaisanen |
| 2010/0107066 A1 | 4/2010 | Hiitola et al. |
| 2010/0107067 A1 | 4/2010 | Vaisanen |
| 2010/0107116 A1 | 4/2010 | Rieman et al. |
| 2012/0212438 A1 | 8/2012 | Vaisanen |

FOREIGN PATENT DOCUMENTS

| | | |
|---|---|---|
| EP | 1085403 A2 | 3/2001 |
| EP | 1316055 A1 | 6/2003 |
| EP | 1316055 A4 | 6/2003 |
| EP | 1423845 A1 | 6/2004 |
| EP | 1674976 A2 | 6/2006 |
| EP | 1774427 A2 | 4/2007 |
| EP | 1942399 A1 | 7/2008 |
| EP | 1976242 A1 | 10/2008 |
| JP | 5143235 A2 | 6/1993 |
| JP | 2008059603 A2 | 3/2008 |
| TW | 504652 B | 10/2002 |
| TW | 200823738 A | 6/2008 |
| WO | 9800775 A1 | 1/1998 |
| WO | 01/93182 A1 | 12/2001 |
| WO | 0208881 A2 | 1/2002 |
| WO | 03021568 A1 | 3/2003 |
| WO | 03065192 A1 | 8/2003 |
| WO | 2004111816 A2 | 12/2004 |
| WO | 2005057397 A2 | 6/2005 |
| WO | 2005104709 A2 | 11/2005 |
| WO | 2006020304 A2 | 2/2006 |
| WO | 2006096501 A1 | 9/2006 |
| WO | 2007109429 A2 | 9/2007 |
| WO | 2007133483 A1 | 11/2007 |
| WO | 2009/158685 A1 | 12/2009 |

OTHER PUBLICATIONS

International Search Report and Written Opinion of the International Searching Authority for related Application PCT/IB2009/054729, dated Mar. 15, 2010.

Bederson et al., "A Fisheye Calendar Interface for PDAs: Providing Overviews for Small Displays" Sep. 2002.

Gibson, "Precision Pointing with Fat Fingers: A new technique for touch screens could make them easier to use", Technology Review Published by MIT, May 23, 2007, http://www.technologyreview.com/Infotech/18770.

Non-Final Office Action from related U.S. Appl. No. 11/834,310, dated Jul. 21, 2010.

International Search Report and Written Opinion of the International Searching Authority for related Application PCT/IB2008/001491, dated Jun. 19, 2009.

Office Action from related European Patent Applicaiton No. 08762827.7 dated Jun. 15, 2010.

IEEE 802.11—IEEE Standard for Information technology—Telecommunications and information exchange between systems—Local and metropolitan area networks—Specific requirements Part 11: Wireless LAN Medium Access Control (MAC) and Physical Layer (PHY) Specifications, Jun. 2007.

IEEE 802.16—IEEE Standard for Local and metropolitan area networks Part 16: Air Interface for Broadband Wireless Access Systems, May 2009.

Office Action received in corresponding U.S. Appl. No. 12/258766, Dated Dec. 7, 2011, 22 pages.

International Search Report and Written Opinion of the International Searching Authority for corresponding International Patent Cooperation Treaty Application PCT/IB2010/050752, dated May 26, 2010, pp. 1-12.

"Media Types";http://www.howtocreate.co.uk/tutorials/css/mediatypes, printed from the Internet Jan. 29, 2010.

Non-Final Office action received for corresponding U.S. Appl. No. 12/389,905, dated Aug. 22, 2011, 9 pages.

International Preliminary Report on Patentability received for corresponding Patent Cooperation Treaty Application No. PCT/IB2010/050752, dated Sep. 1, 2011, 8 pages.

Taiwan Search Report received in Taiwan Patent Application No. 99105008, dated Oct. 6, 2014, 2 pages.

Board's Decision dated Jul. 23, 2015 corresponding to Chinese Patent Application No. 201080008643.0 and English translation thereof.

\* cited by examiner

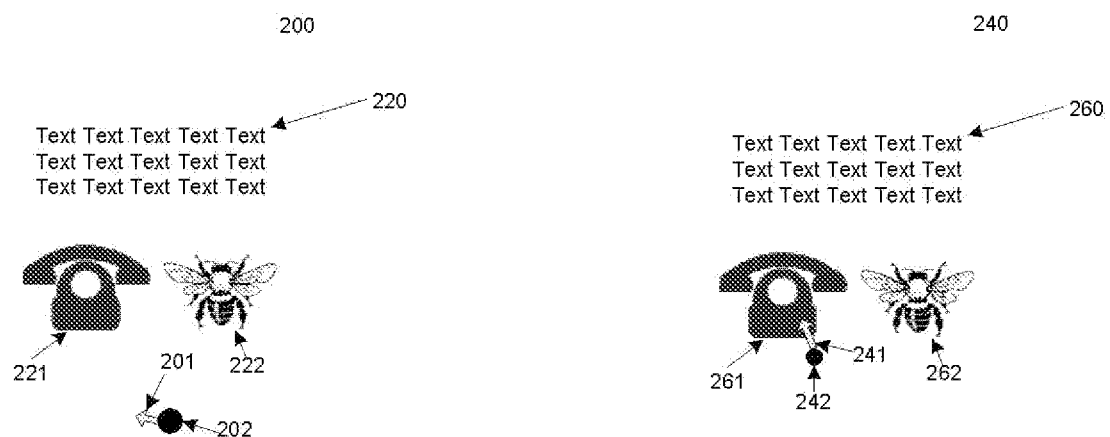

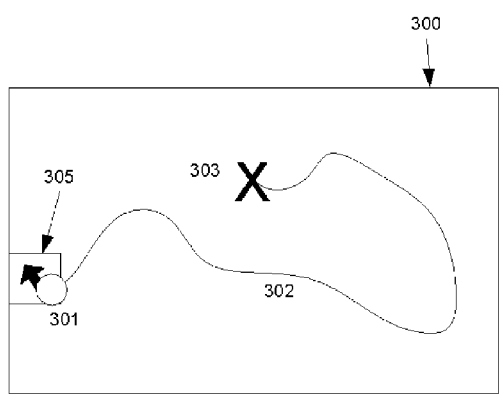
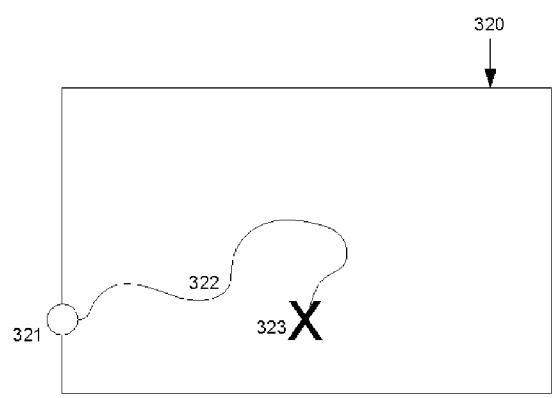
FIG. 3A
FIG. 3B

METHOD AND APPARATUS FOR CAUSING DISPLAY OF A CURSOR

RELATED APPLICATION

This application is a Continuation-in-Part and claims priority benefit from U.S. patent application Ser. No. 12/389,905, filed Feb. 20, 2009.

TECHNICAL FIELD

The present application relates generally to touch input.

BACKGROUND

There has been a recent surge in the use of touch displays on electronic devices. The user may provide input to the electronic device to perform various operations.

SUMMARY

Various aspects of examples of the invention are set out in the claims.

An apparatus, comprising a processor, memory including computer program code, the memory and the computer program code configured to, working with the processor, cause the apparatus to perform at least the following, receive indication of a continuous stroke input associated with a contact region of a touch display, the continuous stroke input comprising at least a first input, and a second input, cause display of a cursor offset from the contact region in response to determining that the first input is a cursor mode initiation input, cause display of cursor to move so that the cursor remains offset from the contact region in response to determining that the second input relates to a movement input, and determine an operation based, at least in part, on position of at least part of a cursor is disclosed.

A method comprising receiving indication of a continuous stroke input associated with a contact region of a touch display, the continuous stroke input comprising at least a first input, and a second input, causing display of a cursor offset from the contact region in response to determining that the first input is a cursor mode initiation input, causing display of cursor to move so that the cursor remains offset from the contact region in response to determining that the second input relates to a movement input, and determining an operation based, at least in part, on position of at least part of a cursor is disclosed.

A computer-readable medium encoded with instructions that, when executed by a computer, perform receiving indication of a continuous stroke input associated with a contact region of a touch display, the continuous stroke input comprising at least a first input, and a second input, causing display of a cursor offset from the contact region in response to determining that the first input is a cursor mode initiation input, causing display of cursor to move so that the cursor remains offset from the contact region in response to determining that the second input relates to a movement input, and determining all operation based, at least in part, on position of at least part of a cursor is disclosed.

BRIEF DESCRIPTION OF THE DRAWINGS

For a more complete understanding of embodiments of the invention, reference is now made to the following descriptions taken in connection with the accompanying drawings in which:

FIGS. 2A-2B are diagrams illustrating a cursor in relation to an information item according to at least one example embodiment;

FIGS. 3A-3B are diagrams illustrating a continuous stroke input according to at least one example embodiment;

DETAILED DESCRIPTON OF THE DRAWINGS

An embodiment of the invention and its potential advantages are understood by referring to FIGS. 1A through 8 of the drawings.

In an example embodiment, a user may have difficulty performing an input with an accurate and/or a precise position. For example, the user may be performing the touch input using an implement with a large contact area, such as the pad of a finger, the tip of a finger, and/or the like. In such an example, the user may have difficulty providing input associated with graphical representations that are small compared to the contact area of the touch input.

In an example embodiment, a user may have desire to utilize a cursor in conjunction with touch input. The cursor may provide a precise region to utilize when determining input related operations. Without limiting the claims in any way, at least one technical effect of utilizing a cursor in conjunction with touch input is improving precision associated with touch input.

In an example embodiment, the user may desire to efficiently initiate and terminate utilization of the cursor. For example, the user may want to avoid utilizing menus, multiple key presses, multiple touch contacts, and/or the like, to initiate and/or terminate the utilization of the cursor. When positioning the cursor using touch input, the user may desire to avoid having view of the cursor blocked by the implement performing the touch input, such as a finger, stylus, and/or the like.

FIGS. 1A-1E are diagrams illustrating a contact region in relation to a cursor according to at least one example embodiment. The examples of FIGS. 1A-1E are merely examples of contact regions in relation to cursors, and do not limit the scope of the claims. For example, number and/or size of contact region and/or cursor may vary, offset of cursor from contact region may vary, display shape and/or orientation may vary, number of displays may vary, and/or the like.

Figure 8:
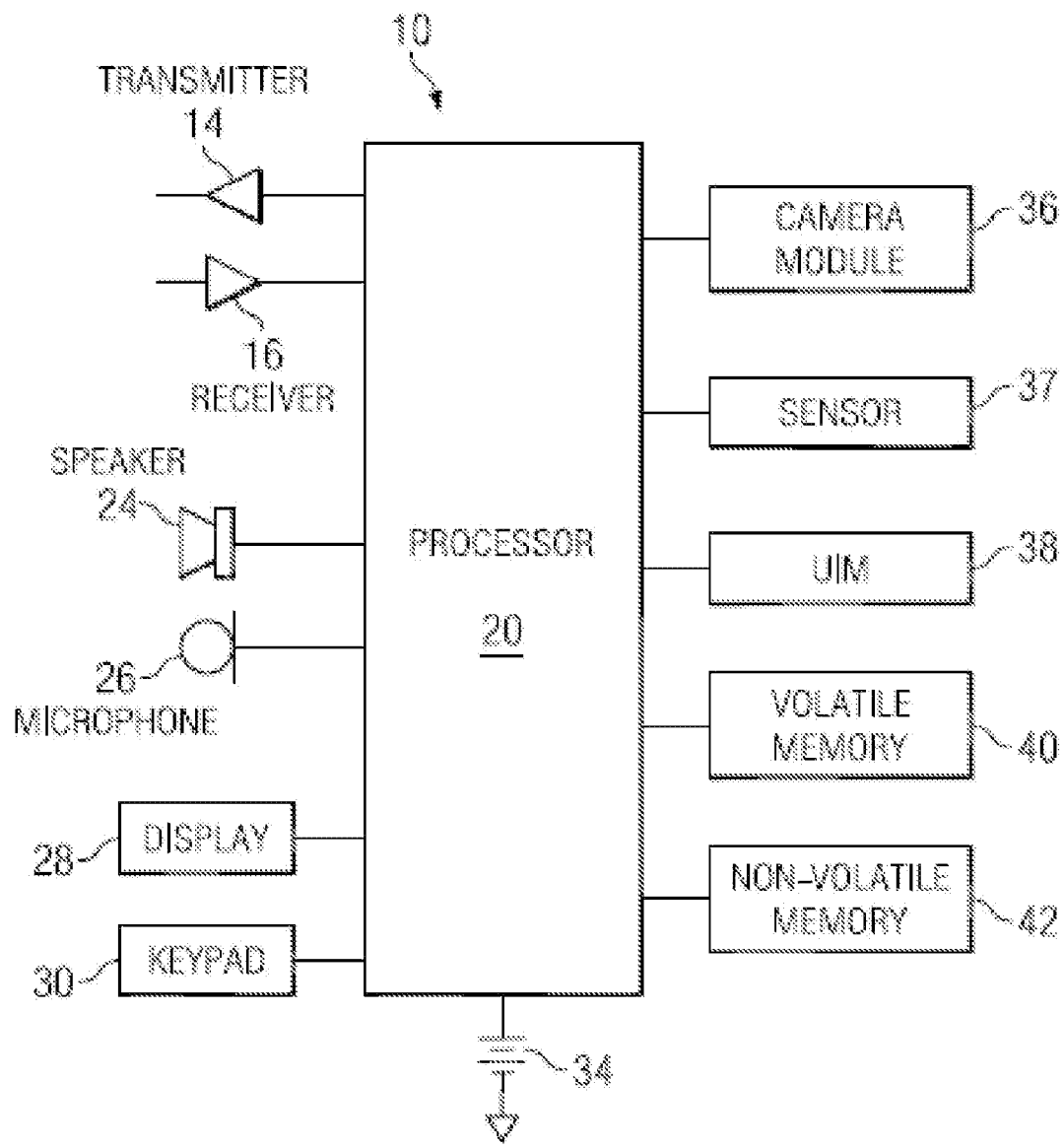
FIG. 8 is a block diagram showing an apparatus according to an example embodiment.

In an example embodiment, a contact region relates to a region of a touch display, such as touch display 28 of FIG. 8, corresponding to contact with an implement of a touch input. For example, if a user is providing touch input using a stylus, the contact region relates to the part of the stylus detected by the apparatus for the touch input. In such an example, if the user is contacting a touch display with the tip of a stylus, the contact region may correspond to the tip of the stylus positioned in relation to the position of the stylus on the touch display. A contact region may vary in size, shape, orientation, and/or the like. For example, a contact region associated with a stylus may vary from a contact region associated with a finger tip.

In an example embodiment, an apparatus causes a cursor to be displayed in relation to the contact region. The cursor may relate to a graphical representation that indicates at least one position. For example, a cursor may relate to a pointer, a box, a circle, and/or the like. The apparatus may utilize the cursor in determining operations associated with user input. For example, the apparatus may perform an operation based on position of at least part of the cursor, such as the tip of a pointer. Without limiting the claims in any way, at least one technical effect relating to the cursor is allowing the apparatus to base operations on position with reduced interference from variation in contact region.

In an example embodiment, the cursor is offset from the contact region. The offset may be predetermined, determined by a user, determined by the apparatus, and/or the like. For example, a user may provide a setting that provides, at least partial, basis for the cursor offset. In another example, the apparatus may determine the cursor offset, for example, based on contact region. In such an example, the apparatus may determine a large cursor offset associated with a large contact region, a small offset associated with a small contact region, and/or the like. The cursor may be offset from the contact region in various directions. For example, the cursor may be offset above, below, beside, and/or the like, from the contact region. Without limiting the claims in any way, at least one technical effect relating to cursor offset is reducing input error associated with the implement performing the touch input concealing the cursor.

Figure 1A:
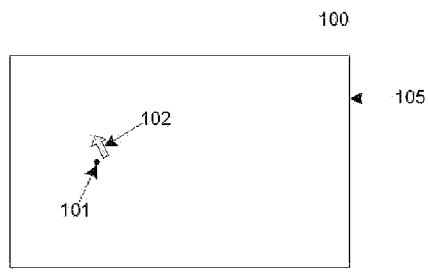
FIGS. 1A-1E are diagrams illustrating a contact region in relation to a cursor according to at least one example embodiment.

FIG. 1A illustrates a cursor 102 in relation to a contact region 101 associated with a touch input of touch display 105. Touch display 105 may be similar as described with reference to display 28 of FIG. 8. In the example of FIG. 1A, contact region 101 relates to a small contact region. Contact region 101 may be associated with touch input of a stylus, pen, and/or the like. Cursor 102 is offset to the upper right of contact region 101.

Figure 1B:
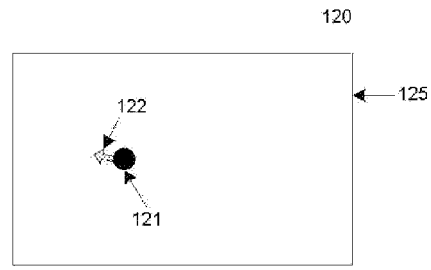

FIG. 1B illustrates a cursor 122 in relation to a contact region 121 associated with a touch input of touch display 125. Touch display 125 may be similar as described with reference to display 28 of FIG. 8. In the example of FIG. 1B, contact region 121 relates to a large contact region. Contact region 121 may be associated with touch input of a fingertip, finger pad, and/or the like. Cursor 122 is offset to the left of contact region 121.

In an example embodiment, an apparatus causes display of at least one graphical representation of a button. A graphical representation of a button may relate to an icon, a box, an image, and/or the like. The button may be associated with an operation. For example, the apparatus may perform the operation in response to receiving input correlating to the graphical representation of the button. The apparatus may cause display of the graphical representation of the button in conjunction with causing display of the cursor, in conjunction with the cursor correlating to an information item, similar as described with reference to FIGS. 2A-2B, and/or the like. For example, the apparatus may cause display of one or more graphical representations of buttons. In such an example, the buttons may be associated with operations relating to an information item that corresponds to position of the cursor. In another example, the apparatus may cause display of one or more graphical representations of buttons when the apparatus causes display of the cursor. In such an example, the apparatus may cause termination of display of the one or more graphical representations of buttons when the apparatus causes termination of display of the cursor. The graphical representation of the button may indicate an operation associated with the button. For example, a button may associate with an open operation. In such an example, the button may indicate the open operation.

The number of graphical representations of buttons may vary based, at least in part, on a predetermined directive, an information item corresponding to position of the cursor, and/or the like. For example, a predetermined directive may relate to a user setting, a default setting, and/or the like. In another example, number of graphical representations of buttons may be based, at least in part, on operations of a program associated with an information item that corresponds to position of the cursor. In such an example, the information item may relate to an email program, and there may be a graphical representation of a button indicating a create email operation and a different graphical representation of a button indicating a view inbox operation. In another example, the information item may relate to a video, and there may be a single graphical representation of a button indicating a view operation.

Figure 1C:
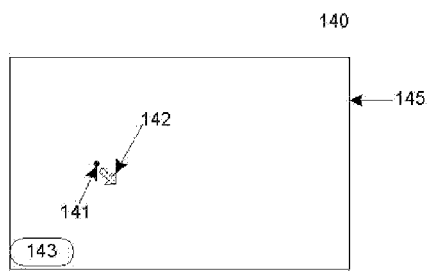

FIG. 1C illustrates a cursor 142 in relation to a contact region 141 associated with a touch input of touch display 145. Touch display 145 may be similar as described with reference to display 28 of FIG. 8. In the example of FIG. 1C, contact region 141 relates to a small contact region. Contact region 141 may be associated with touch input of a stylus, pen, and/or the like. Cursor 142 is offset to the lower right of contact region 141. Graphical representation of button 143 is positioned in the lower left of touch display 145. In the example of FIG. 1C, graphical representation of button 143 does not indicate an associated operation.

Figure 1D:
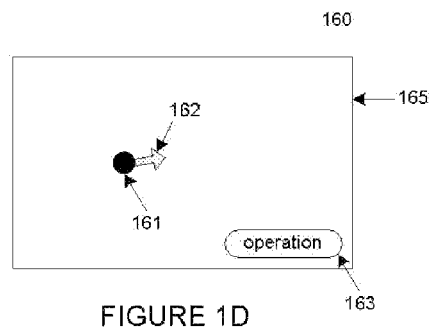

FIG. 1D illustrates a cursor 162 in relation to a contact region 161 associated with a touch input of touch display 165. Touch display 165 may be similar as described with reference to display 28 of FIG. 8. In the example of FIG. 1D, contact region 161 relates to a large contact region. Contact region 161 may be associated with touch input of a finger tip, finger pad, and/or the like. Cursor 162 is offset to the right of contact region 161. Graphical representation of button 163 is positioned in the lower right of touch display 165. In the example of FIG. 1D, graphical representation of button 163 indicates an associated operation.

Figure 1E:
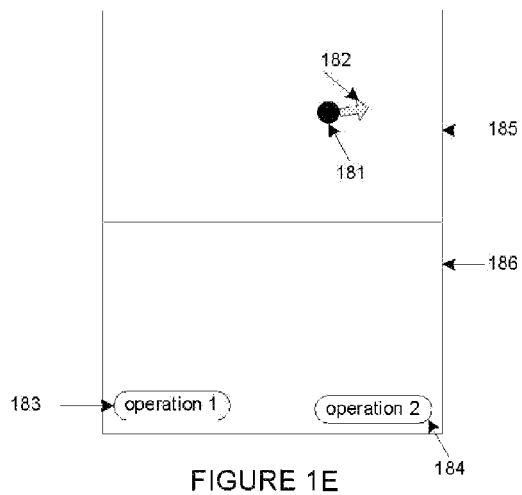

FIG. 1E illustrates a cursor 182 in relation to a contact region 181 associated with a touch input of touch display 185. Touch display 185 may be similar as described with reference to display 28 of FIG. 8. In the example of FIG. 1E, contact region 181 relates to a large contact region. Contact region 181 may be associated with touch input of a finger tip, finger pad, and/or the like. Cursor 182 is offset to the right of contact region 181. Graphical representation of button 183 is positioned in the lower left of touch display 186. In the example of FIG. 1E, graphical representation of button 183 indicates an associated operation. Graphical representation of button 184 is positioned in the lower right of touch display 186. In the example of FIG. 1E, graphical representation of button 184 indicates an associated operation.

FIGS. 2A-2B are diagrams illustrating a cursor in relation to an information item according to at least one example embodiment. The examples of FIGS. 2A-2B are merely examples of cursors in relation to an information items, and do not limit the scope of the claims. For example, number and/or size of cursor and/or information items may vary.

In an example embodiment, an information item relates to image information, text information, video information, widget information, icon information, a button, a link, a shortcut, an operation indicator, and/or the like. A link may relate to a uniform resource locator (URL). For example, a link may relate to a webpage, a file, and/or the like. Text information may relate to a character, a group of characters, a word, a group of words, a line of text, a column of text, a block of text, and/or the like. An information item may comprise one or more other information items. For example, an information item may comprise an image information item and a URL information item. In another example, an information item may comprise two blocks of text.

FIG. 2A illustrates a cursor 201 in relation to a contact region 202 associated with a touch input, in relation to information items 220, 221, and 222. Information item 220 relates to text information. Information item 221 may relate to a program, such as a telephony program. Information item 222 may relate to a video. In the example of FIG. 2A, position of the cursor does not correspond to an information item.

FIG. 2B illustrates a cursor 241 in relation to a contact region 242 associated with a touch input, in relation to information items 260, 261, and 262. Information item 260 relates to text information. Information item 261 may relate to a program, such as a telephony program. Information item 262 may relate to a video. In the example of FIG. 2B, position of at least part of the cursor corresponds to information item 261. In an example embodiment, an apparatus determines that position of at least part of a cursor corresponds to an information item when at least part of the cursor coincides with at least part of the information item. For example, the apparatus may determine that at least part of a cursor corresponds to the information item based, at least in part, on the point of the cursor coinciding with part of information item 261.

An apparatus may perform an operation associated with an information item that corresponds to position of the cursor. For example, the apparatus may perform a mouse over operation associated with the information item based, at least in part, on the correspondence. In such an example, the operation may relate to causing display of information associated with the information item.

FIGS. 3A-3B are diagrams illustrating a continuous stroke input according to at least one example embodiment. The examples of FIGS. 3A-3B are merely examples of continuous stroke inputs, and do not limit the scope of the claims. For example, position associated with part or all of the continuous stroke input may vary, there may be inputs in addition to the continuous stroke input, and/or the like. In another example, the continuous stroke input may span more than one touch display.

Figure 7A:
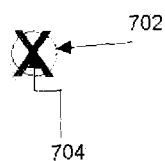
FIGS. 7A-7E are diagrams illustrating input associated with a touch display according to an example embodiment.
Figure 7B:
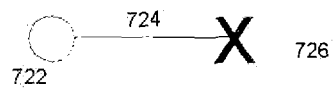

The examples of FIGS. 3A-3B illustrate a continuous stroke input, such as continuous stroke input 720 of FIG. 7B, that comprise a cursor mode initiation input. A cursor mode initiation input relates to one or more inputs that indicate that the apparatus should utilize a cursor, such as described with reference to FIGS. 1A-1E and FIGS. 2A-2B. The cursor mode initiation input may relate to input corresponding to an information item, input indicating a gesture, input associated with a position, and/or the like.

The cursor may relate to, at least part of, the continuous stroke input. For example, an apparatus may cause display of the cursor to move so that the cursor remains offset from a contact region associated with the continuous stroke input.

Figure 7C:
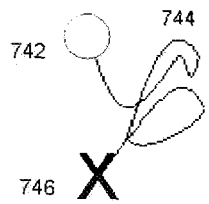

In the examples of FIGS. 3A-3B, the continuous stroke input comprises a contact input, such as contact input 742 of FIG. 7C, a movement input, such as movement input 724 of FIG. 7B, and a release input, such as release input 704 of FIG. 7A. In an example embodiment, the apparatus may receive indication of the release input after receiving indication of the contact input and indication of the movement input.

FIG. 3A illustrates a continuous stroke input comprising contact input 301, movement input 302, and release input 303 in relation to touch display 300. Information item 305 relates to cursor mode initiation. An apparatus may determine that contact input 301 is a cursor mode initiation input based, at least in part on position of contact input 301 at least partially coinciding with information item 305.

In an example embodiment, a touch display boundary relates to a boundary beyond which touch input is not received by the touch display. For example, a movement input, such as movement input 724 of FIG. 7B, associated with a continuous stroke input, such as continuous stroke input 720 of FIG. 7B, may relate to a movement where contact associated with the continuous stroke input moves beyond or to a touch display boundary. In such an example, the continuous stroke input may comprise a release input related to exiting the touch display boundary. Such a release input relating to an exiting touch display boundary input may be positioned near or at a touch display boundary. In another example, a movement input, such as movement input 744 of FIG. 7C, associated with a continuous stroke input, such as continuous stroke input 740 of FIG. 7C, may relate to a movement where contact with an apparatus comprising a touch display is beyond a touch display boundary and the movement associated with the contact crosses the touch display boundary. In such an example, crossing of the touch display boundary may be associated with a contact input, such as contact input 762 of FIG. 7D, relating to an entering touch display boundary input. Such a contact input relating to an entering touch display boundary input may be positioned near or at a touch display boundary.

In an example embodiment, an apparatus bases determination that a contact input is a cursor mode initiation input, at least in part, on the contact input relating to an entering touch display boundary input. In such an embodiment, the apparatus may further base the determination that the contact input is a cursor mode initiation input, at least in part, on another aspect of the contact input. For example, such an aspect may relate to which boundary of a touch display to which the contact input relates, position of the contact input, and/or the like.

FIG. 3B illustrates a continuous stroke input comprising contact input 321, movement input 322, and release input 323 in relation to touch display 320. In the example of FIG. 3B, an apparatus may determine that contact input 321 relates to an entering touch display boundary input based, at least in part, on contact input 321 being at or near a boundary of touch display 320. In an example embodiment, the apparatus may determine that contact input 321 is a cursor mode initiation input based, at least in part, on contact input 321 relating to an entering touch display boundary input, on contact input 321 relating to a left entering touch display boundary input, and/or the like.

Figure 4A:
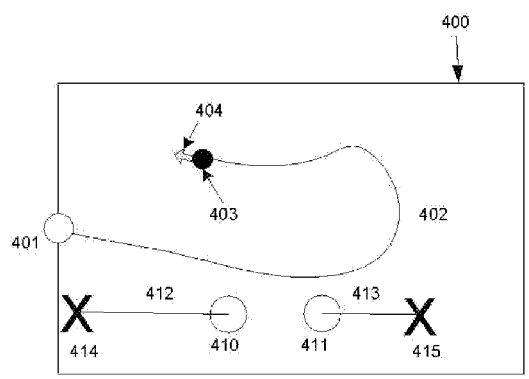
FIGS. 4A-4C are diagrams illustrating a continuous stroke input in relation to a cursor according to at least one example embodiment.
Figure 4B:
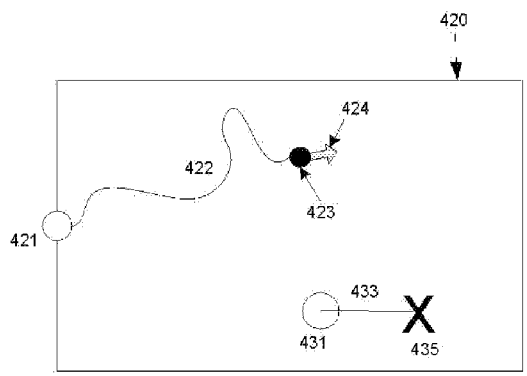
Figure 4C:
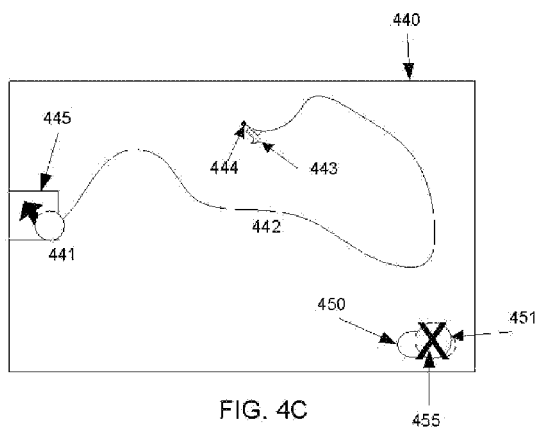

FIGS. 4A-4C are diagrams illustrating a continuous stroke input, such as continuous stroke input 740 of FIG. 7C in relation to a cursor according to at least one example embodiment. The examples of FIGS. 4A-4C are merely examples of continuous stroke inputs, and do not limit the scope of the claims. For example, position associated with part or all of the continuous stroke input may vary, there may be inputs in addition to the continuous stroke inputs, and/or the like. In another example, the continuous stroke input may span more than one touch display.

In an example embodiment, an apparatus receives the continuous stroke input and a separate concurrent touch input. The apparatus may perform an operation associated with the separate concurrent input. The operation may relate to an operation associated with a cursor, and/or an operation un-associated with the cursor. For example, the operation may relate to initiating an operation associated with position of at least part of the cursor. In another example, the operation may relate to a default operation unrelated to the cursor, such as selecting an information item, zooming, panning, and/or the like.

The examples of FIGS. 4A-4C illustrate the continuous stroke input associated with the cursor in relation to one or more separate concurrent touch inputs, similar as described with reference to FIG. 7E. In an example embodiment, separate concurrent touch inputs relate to performing an operation related to the cursor. For example, the separate concurrent touch input may relate to invoking an operation associated with an information item corresponding to position of the cursor. In another example, the separate concurrent touch input may relate to changing cursor size, shape, orientation, and/or the like. In another example embodiment, separate concurrent touch inputs relate to performing an operation unrelated to the cursor. For example, a separate concurrent touch input may relate to zooming, panning, selecting information, and/or the like. Without limiting the claims in any way, at least one technical advantage associated with receiving a continuous stroke input associated with a cursor and a separate concurrent touch input may be allowing a user to perform, and/or invoke an operation separately from the input associated with the cursor.

FIG. 4A illustrates a touch display 400 associated with a continuous stroke input, comprising contact input 401 and movement input 402, associated with contact region 403, which relates to cursor 404. The example of FIG. 4A illustrates a first separate concurrent touch input comprising contact input 410, movement input 412, and release input 414, and a second separate concurrent touch input comprising contact input 411, movement input 413, and release input 415. The first separate concurrent touch input and the second concurrent touch input may relate to a single operation or a plurality of operations. For example, an apparatus may determine that the first separate concurrent touch input and the second separate concurrent touch input may relate to a zoom operation. The zoom operation may relate to zooming in, zooming out, and/or the like.

FIG. 4B illustrates a touch display 420 associated with a continuous stroke input, comprising contact input 421 and movement input 422, associated with contact region 423, which relates to cursor 424. The example of FIG. 4B illustrates a separate concurrent touch input comprising contact input 431, movement input 433, and release input 435. An apparatus may determine that the separate concurrent touch input may relate to a pan operation. The pan operation may relate to panning in one or more directions.

FIG. 4C illustrates a touch display 440 associated with a continuous stroke input, comprising contact input 441 and movement input 442, associated with contact region 444, which relates to cursor 443. Position of contact input 441 at least partially corresponds with information item 445. The example of FIG. 4C illustrates a separate concurrent touch input comprising contact input 451 and release input 455. Position of the separate concurrent touch input, at least partially, corresponds with graphical representation 450 of a button. The separate concurrent touch input may relate to invoking an operation associated with cursor 443. For example, separate concurrent touch input may invoke performing an operation associated with an information item corresponding to cursor 443.

Figure 5:
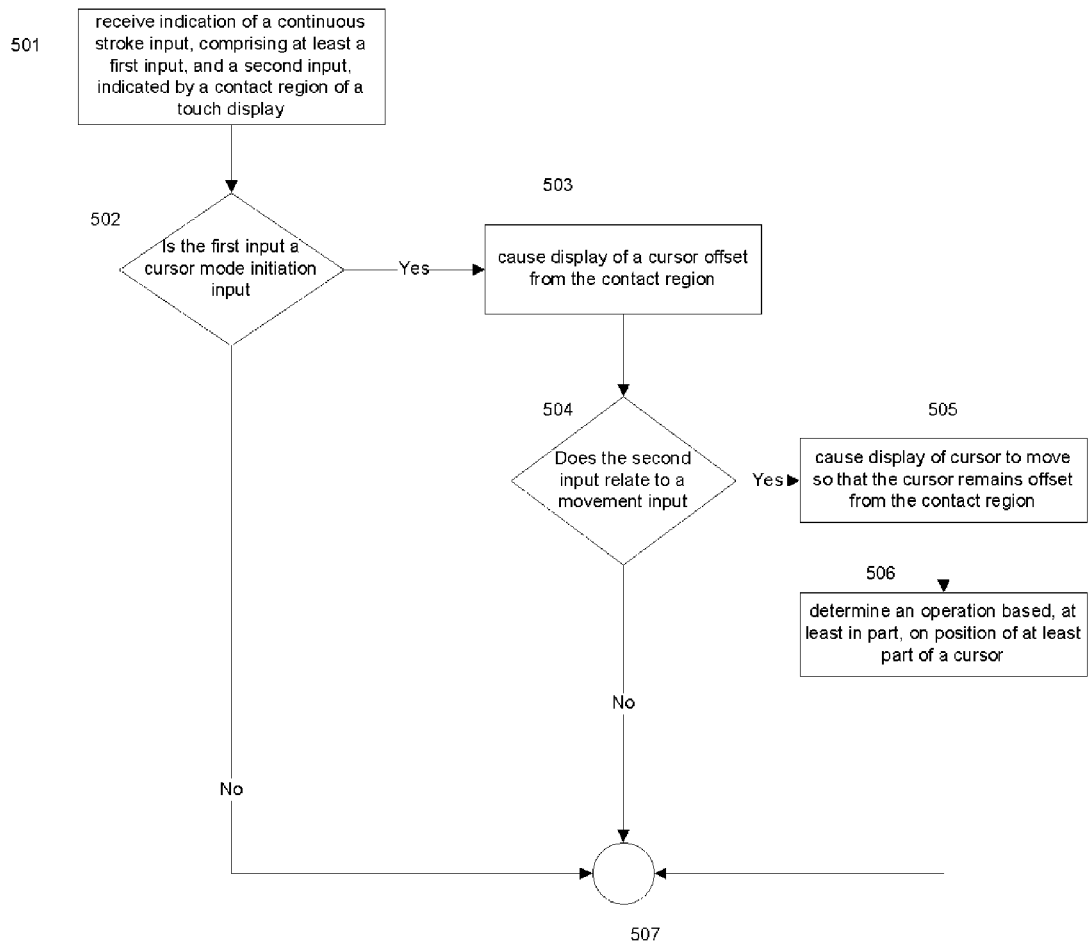
FIG. 5 is a flow diagram showing a set of operations 500 for causing display of a cursor according to an example embodiment.

FIG. 5 is a flow diagram showing a set of operations 500 for causing display of a cursor according to an example embodiment. An apparatus, for example electronic device 10 of FIG. 8 or a portion thereof, may utilize the set of operations 500. The apparatus may comprise means, including, for example processor 20 of FIG. 8, for performing the operations of FIG. 5. In an example embodiment, an apparatus, for example device 10 of FIG. 8, is transformed by having memory, for example memory 42 of FIG. 8, comprising computer code configured to, working with a processor, for example processor 20 of FIG. 8, cause the apparatus to perform set of operations 500.

At block 501, the apparatus receives indication of a continuous stroke input associated with a contact region of a touch display, the continuous stroke input comprising at least a first input, and a second input. The apparatus may receive indication of the continuous stroke input by retrieving information from one or more memories, such as non-volatile memory 42 of FIG. 86, receiving one or more indications of the continuous stroke input from a part of the apparatus, such as a touch display, for example display 28 of FIG. 8, receiving indication of the continuous stroke input from a receiver, such as receiver 16 of FIG. 8, receiving continuous stroke input from a separate device, a separate touch display, and/or the like. In an example embodiment, the continuous stroke input may relate to a plurality of displays, as described with reference to FIGS. 3A-3B and FIGS. 4A-4C. The continuous stroke input may be similar as described with reference to FIGS. 3A-3B and FIGS. 4A-4C. The contact region of the touch display may be similar as described with reference to FIGS. 1A-1E.

At block 502, the apparatus determines whether the first input is a cursor mode initiation input similar as described with reference to FIGS. 3A-3B. If the apparatus determines that the first input is not a cursor mode initiation input, flow exits at block 507. Otherwise, flow proceeds to block 503.

At block 503, the apparatus causes display of a cursor offset from the contact region similar as described with reference to FIGS. 1A-1E.

At block 504, the apparatus determines whether the second input relates to a movement input, similar as described with reference to FIGS. 3A-3B. If the apparatus determines that the second input does not relate to a movement input, flow exits at block 507. Otherwise flow proceeds to block 505.

At block 505, the apparatus causes display of cursor to move so that the cursor remains offset from the contact region, similar as described with reference to FIGS. 3A-3B.

At block 506, the apparatus determine an operation based, at least in part, on position of at least part of a cursor, similar as described with reference to FIGS. 1A-1E and FIGS. 2A-2B. For example, the apparatus may perform an operation related to displaying information related to an information item at least partially corresponding to position of at least part of the cursor, similar as described with reference to FIGS. 4A-4B.

In an example embodiment, the apparatus further bases the operation, at least in part, on receiving a key press. For example, the apparatus may perform the determination of the operation in response to receiving indication of the key press. In such an embodiment, the apparatus may further base determination of the operation, at least in part, on duration of the key press. For example, the apparatus may perform an operation associated with a short key press and a different operation associated with a long key press.

In an example embodiment, a touch display provides information associated with force applied associated with a touch input. In such an embodiment, the apparatus may base the operation, at least in part, on force information associated with the continuous stroke input. For example, if the continuous stroke input comprises an increased force input, such as a heavy press input, the apparatus may determine the operation in response to the heavy press input.

Figure 6:
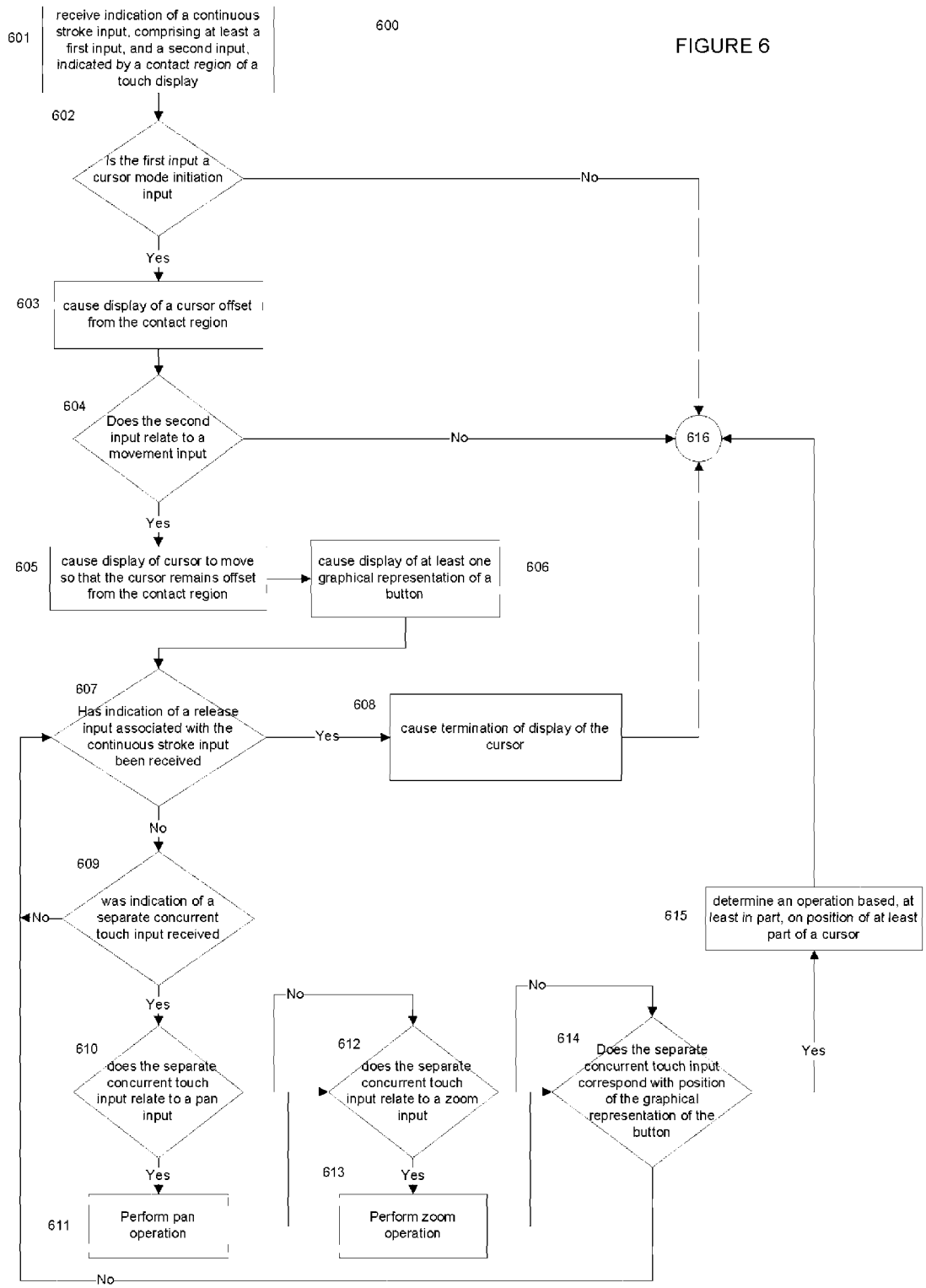
FIG. 6 is a flow diagram showing a set of operations for causing display of a cursor according to an example embodiment.

FIG. 6 is a flow diagram showing a set of operations 600 for causing display of a cursor according to an example embodiment. An apparatus, for example electronic device 10 of FIG. 8 or a portion thereof, may utilize the set of operations 600. The apparatus may comprise means, including, for example processor 20 of FIG. 8, for performing the operations of FIG. 6. In an example embodiment, an apparatus, for example device 10 of FIG. 8, is transformed by having memory, for example memory 42 of FIG. 8, comprising computer code configured to, working with a processor, for example processor 20 of FIG. 8, cause the apparatus to perform set of operations 600.

At block 601, the apparatus receives indication of a continuous stroke input associated with a contact region of a touch display, the continuous stroke input comprising at least a first input, and a second input, similar as described with reference to block 501 of FIG. 5.

At block 602, the apparatus determines whether the first input is a cursor mode initiation input similar as described with reference to block 502 of FIG. 5. If the apparatus determines that the first input is not a cursor mode initiation input, flow exits at block 616. Otherwise, flow proceeds to block 603.

At block 603, the apparatus causes display of a cursor offset from the contact region similar as described with reference to block 503 of FIG. 5.

At block 604, the apparatus determines whether the second input relates to a movement input, similar as described with reference to block 504 of FIG. 5. If the apparatus determines that the second input does not relate to a movement input, flow exits at block 616. Otherwise flow proceeds to block 605.

At block 605, the apparatus causes display of cursor to move so that the cursor remains offset from the contact region, similar as described with reference to block 505 of FIG. 5.

At block 606, the apparatus causes display of at least one graphical representation of a button, similar as described with reference to FIGS. 1A-1E.

At block 607, the apparatus determines whether indication of a release input associated with the continuous stroke input has been received. The release input may be similar as described with reference FIGS. 3A-3B. If the apparatus determines that a release input was not received, flow proceeds to block 609. Otherwise, flow proceeds to block 608.

At block 608, the apparatus causes termination of display of the cursor. For example, the apparatus may cease causing display of the cursor.

If, at block 607, the apparatus determined that indication of a release input was not received, at block 609, the apparatus determines whether indication of a separate concurrent touch input was received, similar as described with reference to FIGS. 4A-4C. If the apparatus determines that indication of a separate concurrent touch input was not received, flow proceeds to block 607. Otherwise, flow proceeds to block 610.

At block 610, the apparatus determines whether the separate concurrent touch input relates to a pan input, similar as described with reference to FIG. 4B and FIG. 7D. If the apparatus determines that the separate concurrent touch input relates to a pan input, flow proceeds to block 612. Otherwise, flow proceeds to block 611.

At block 611, the apparatus performs a pan operation, similar as described with reference to FIG. 4B.

At block 612, the apparatus determines whether the indication of the separate concurrent touch input relates to a zoom operation, similar as described with reference to FIG. 4A. If the apparatus determines that the separate concurrent touch input does not relate to a zoom input, flow proceeds to block 614. Otherwise, flow proceeds to block 613.

At block 613, the apparatus performs a zoom operation similar as described with reference to FIG. 4A.

At block 614, the apparatus determines whether the separate concurrent touch input corresponds with position of the graphical representation of the button, similar as described with reference to FIG. 4C. If the apparatus determines that the separate concurrent touch input does not correspond with position of the graphical representation of the button, flow proceeds to block 607. Otherwise, flow proceeds to block 615.

At block 615, the apparatus determines an operation based, at least in part, on position of at least part of a cursor, similar as described with reference to block 506 of FIG. 5. In an example embodiment, the apparatus further bases determination of the operation, at least in part, on duration of the separate concurrent touch input. For example, the apparatus may perform an operation associated with a short separate concurrent touch input and a different operation associated with a long separate concurrent touch input.

In an example embodiment, a touch display provides information associated with force applied associated with a touch input. In such an embodiment, the apparatus may base the operation, at least in part, on force information associated with the separate concurrent touch input. For example, if the separate concurrent touch input comprises a high-force input, such as a heavy press input, the apparatus may determine an operation in response to the heavy press input. In another example, if the separate concurrent touch input comprises a low-force input, such as a light press input, the apparatus may determine a different operation in response to the light press input.

FIGS. 7A-7E are diagrams illustrating input associated with a touch display, for example from display 28 of FIG. 8, according to an example embodiment. In FIGS. 7A-7E, a circle represents an input related to contact with a touch display, two crossed lines represent an input related to releasing a contact from a touch display, and a line represents input related to movement on a touch display. Although the examples of FIGS. 7A-7E indicate continuous contact with a touch display, there may be a part of the input that fails to make direct contact with the touch display. Under such circumstances, the apparatus may, nonetheless, determine that the input is a continuous stroke input. For example, the apparatus may utilize proximity information, for example information relating to nearness of an input implement to the touch display, to determine part of a touch input.

In the example of FIG. 7A, input 700 relates to receiving contact input 702 and receiving a release input 704. In this example, contact input 702 and release input 704 occur at the same position. In an example embodiment, an apparatus utilizes the time between receiving contact input 702 and release input 704. For example, the apparatus may interpret input 700 as a tap for a short time between contact input 702 and release input 704, as a press for a longer time between contact input 702 and release input 704, and/or the like. In such an example, a tap input may induce one operation, such as selecting an item, and a press input may induce another operation, such as performing an operation on an item. In another example, a tap and/or press may relate to a user selected text position.

In the example of FIG. 7B, input 720 relates to receiving contact input 722, a movement input 724, and a release input 726. Input 720 relates to a continuous stroke input. In this example, contact input 722 and release input 726 occur at different positions. Input 720 may relate to dragging an object from one position to another, to moving a scroll bar, to panning a virtual screen, to drawing a shape, and/or the like. In an example embodiment, an apparatus interprets input 720 based at least in part on the speed of movement 724. For example, if input 720 relates to panning a virtual screen, the panning motion may be small for a slow movement, large for a fast movement, and/or the like. In another example embodiment, an apparatus interprets input 720 based at least in part on the distance between contact input 722 and release input 726. For example, if input 720 relates to a scaling operation, such as resizing a box, the scaling may relate to the distance between contact input 722 and release input 726. An apparatus may interpret the input before receiving release input 726. For example, the apparatus may evaluate a change in the input, such as speed, position, and/or the like. In such an example, the apparatus may perform one or more determinations based upon the change in the touch input. In such an example, the apparatus may modify a text selection point based at least in part on the change in the touch input.

In the example of FIG. 7C, input 740 relates to receiving contact input 742, a movement input 744, and a release input 746 as shown. Input 740 relates to a continuous stroke input. In this example, contact input 742 and release input 746 occur at different positions. Movement input 744 may comprise a plurality of movement inputs. For example, movement input 744 may comprise a movement input received a point in time, and a different movement input received at a later time.

Input 740 may relate to dragging an object from one position to another, to moving a scroll bar, to panning a virtual screen, to drawing a shape, and/or the like. In an example embodiment, an apparatus interprets input 740 based at least in part on the speed of movement 744. For example, if input 740 relates to panning a virtual screen, the panning motion may be small for a slow movement, large for a fast movement, and/or the like. In another example embodiment, an apparatus interprets input 740 based at least in part on the distance between contact input 742 and release input 746. For example, if input 740 relates to a scaling operation, such as resizing a box, the scaling may relate to the distance between contact input 742 and release input 746. In still another example embodiment, the apparatus interprets the position of the release input. In such an example, the apparatus may modify a text selection point based at least in part on the change in the touch input.

Figure 7D:
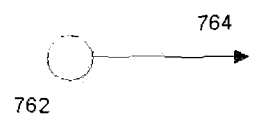

In the example of FIG. 7D, input 760 relates to receiving contact input 762, and a movement input 764, where contact is released during movement. Input 760 relates to a continuous stroke input. Input 760 may relate to dragging an object from one position to another, to moving a scroll bar, to panning a virtual screen, to drawing a shape, and/or the like. In an example embodiment, an apparatus interprets input 760 based at least in part on the speed of movement 764. For example, if input 760 relates to panning a virtual screen, the panning motion may be small for a slow movement, large for a fast movement, and/or the like. In another example embodiment, an apparatus interprets input 760 based at least in part on the distance associated with the movement input 764. For example, if input 760 relates to a scaling operation, such as resizing a box, the scaling may relate to the distance of the movement input 764 from the contact input 762 to the release of contact during movement.

In an example embodiment, an apparatus may receive multiple touch inputs at coinciding times. For example, there may be a tap input at a position and a different tap input at a different location during the same time. In another example there may be a tap input at a position and a drag input at a different position. An apparatus may interpret the multiple touch inputs separately, together, and/or a combination thereof. For example, an apparatus may interpret the multiple touch inputs in relation to each other, such as the distance between them, the speed of movement with respect to each other, and/or the like.

Figure 7E:
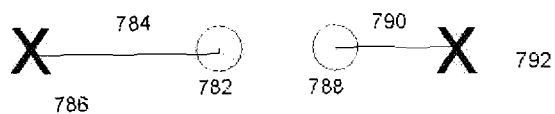

In the example of FIG. 7E, input 780 relates to receiving contact inputs 782 and 788, movement inputs 784 and 790, and release inputs 786 and 792. Input 780 relates to two continuous stroke inputs that may be received at least partially concurrently with each other. In this example, contact input 782 and 788, and release input 786 and 792 occur at different positions. Input 780 may be characterized as separate concurrent touch inputs. Input 780 may relate to dragging an object from one position to another, to moving a scroll bar, to panning a virtual screen, to drawing a shape, to indicating one or more user selected text positions and/or the like. In an example embodiment, an apparatus interprets input 780 based at least in part on the speed of movements 784 and 790. For example, if input 780 relates to zooming a virtual screen, the zooming motion may be small for a slow movement, large for a fast movement, and/or the like. In another example embodiment, an apparatus interprets input 780 based at least in part on the distance between contact inputs 782 and 788 and release inputs 786 and 792. For example, if input 780 relates to a scaling operation, such as resizing a box, the scaling may relate to the collective distance between contact inputs 782 and 788 and release inputs 786 and 792.

In an example embodiment, the timing associated with the apparatus receiving contact inputs 782 and 788, movement inputs 784 and 790, and release inputs 786 and 792 varies. For example, the apparatus may receive contact input 782 before contact input 788, after contact input 788, concurrent to contact input 788, and/or the like. The apparatus may or may not utilize the related timing associated with the receiving of the inputs. For example, the apparatus may utilize an input received first by associating the input with a preferential status, such as a primary selection point, a starting position, and/or the like. In another example, the apparatus may utilize non-concurrent inputs as if the apparatus received the inputs concurrently. In such an example, the apparatus may utilize a release input received first the same way that the apparatus would utilize the same input if the apparatus had received the input second.

Even though an aspect related to two touch inputs may differ, such as the direction of movement, the speed of movement, the position of contact input, the position of release input, and/or the like, the touch inputs may be similar. For example, a first touch input comprising a contact input, a movement input, and a release input, may be similar to a second touch input comprising a contact input, a movement input, and a release input, even though they may differ in the position of the contact input, and the position of the release input.

Although the examples of FIGS. 7A-7E illustrate touch inputs in relation to a single touch display, a touch input may span a plurality of touch displays. For example, a movement input may cross from one touch display to another touch display one or more times.

FIG. 8 is a block diagram showing an apparatus, such as an electronic device 10, according to an example embodiment. It should be understood, however, that an electronic device as illustrated and hereinafter described is merely illustrative of an electronic device that could benefit from embodiments of the invention and, therefore, should not be taken to limit the scope of the invention. While one embodiment of the electronic device 10 is illustrated and will be hereinafter described for purposes of example, other types of electronic devices, such as, but not limited to, portable digital assistants (PDAs), pagers, mobile computers, desktop computers, televisions, gaming devices, laptop computers, media players, cameras, video recorders, global positioning system (GPS) devices and other types of electronic systems, may readily employ embodiments of the invention. Moreover, the apparatus of an example embodiment need not be the entire electronic device, but may be a component or group of components of the electronic device in other example embodiments.

Furthermore, devices may readily employ embodiments of the invention regardless of their intent to provide mobility. In this regard, even though embodiments of the invention are described in conjunction with mobile communications applications, it should be understood that embodiments of the invention may be utilized in conjunction with a variety of other applications, both in the mobile communications industries and outside of the mobile communications industries.

The electronic device 10 may comprise an antenna, (or multiple antennae), a wired connector, and/or the like in operable communication with a transmitter 14 and a receiver 16. The electronic device 10 may further comprise a processor 20 or other processing circuitry that provides signals to and receives signals from the transmitter 14 and receiver 16, respectively. The signals may comprise signaling information in accordance with a communications interface standard, user speech, received data, user generated data, and/or the like. The electronic device 10 may operate with one or more air interface standards, communication protocols, modulation types, and access types. By way of illustration, the electronic device 10 may operate in accordance with any of a number of first, second, third and/or fourth-generation communication protocols or the like. For example, the electronic device 10 may operate in accordance with wireline protocols, such as Ethernet, digital subscriber line (DSL), asynchronous transfer mode (ATM), second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), or with fourth-generation (4G) wireless communication protocols, wireless networking protocols, such as 802.11, short-range wireless protocols, such as Bluetooth, and/or the like.

As used in this application, the term 'circuitry' refers to all of the following: hardware-only implementations (such as implementations in only analog and/or digital circuitry) and to combinations of circuits and software and/or firmware such as to a combination of processor(s) or portions of processor(s)/software including digital signal processor(s), software, and memory(ies) that work together to cause an apparatus, such as a mobile phone or server, to perform various functions and to circuits, such as a microprocessor(s) or portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor, multiple processors, or portion of a processor and its (or their) accompanying software and/or firmware. The term "circuitry" would also cover, for example, a baseband integrated circuit or applications processor integrated circuit for a mobile phone or a similar integrated circuit in a cellular network device or other network device.

Processor 20 may comprise means, such as circuitry, for implementing audio, video, communication, navigation, logic functions, and/or the like, as well as for implementing embodiments of the invention including, for example, one or more of the functions described in conjunction with FIGS. 1-8. For example, processor 20 may comprise means, such as a digital signal processor device, a microprocessor device, various analog to digital converters, digital to analog converters, processing circuitry and other support circuits, for performing various functions including, for example, one or more of the functions described in conjunction with FIGS. 1-8. The apparatus may perform control and signal processing functions of the electronic device 10 among these devices according to their respective capabilities. The processor 20 thus may comprise the functionality to encode and interleave message and data prior to modulation and transmission. The processor 20 may additionally comprise an internal voice coder, and may comprise an internal data modem. Further, the processor 20 may comprise functionality to operate one or more software programs, which may be stored in memory and which may, among other things, cause the processor 20 to implement at least one embodiment including, for example, one or more of the functions described in conjunction with FIGS. 1-8. For example, the processor 20 may operate a connectivity program, such as a conventional internet browser. The connectivity program may allow the electronic device 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic device 10 may comprise a user interface for providing output and/or receiving input. The electronic device 10 may comprise an output device such as a ringer, a conventional earphone and/or speaker 24, a microphone 26, a display 28, and/or a user input interface, which are coupled to the processor 20. The user input interface, which allows the electronic device 10 to receive data, may comprise means, such as one or more devices that may allow the electronic device 10 to receive data, such as a keypad 30, a touch display, for example if display 28 comprises touch capability, and/or the like. In an embodiment comprising a touch display, the touch display may be configured to receive input from a single point of contact, multiple points of contact, and/or the like. In such an embodiment, the touch display and/or the processor may determine input based on position, motion, speed, contact area, and/or the like.

The electronic device 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. Display 28 may display two-dimensional information, three-dimensional information and/or the like.

In embodiments including the keypad 30, the keypad 30 may comprise numeric (for example, 0-9) keys, symbol keys (for example, #, *), alphabetic keys, and/or the like for operating the electronic device 10. For example, the keypad 30 may comprise a conventional QWERTY keypad arrangement. The keypad 30 may also comprise various soft keys with associated functions. In addition, or alternatively, the electronic device 10 may comprise an interface device such as a joystick or other user input interface. The electronic device 10 further comprises a battery 34, such as a vibrating battery pack, for powering various circuits that are required to operate the electronic device 10, as well as optionally providing mechanical vibration as a detectable output.

In an example embodiment, the electronic device 10 comprises a media capturing element, such as a camera, video and/or audio module, in communication with the processor 20. The media capturing element may be any means for capturing an image, video and/or audio for storage, display or transmission. For example, in an example embodiment in which the media capturing element is a camera module 36, the camera module 36 may comprise a digital camera which may form a digital image file from a captured image. As such, the camera module 36 may comprise hardware, such as a lens or other optical component(s), and/or software necessary for creating a digital image file from a captured image. Alternatively, the camera module 36 may comprise only the hardware for viewing an image, while a memory device of the electronic device 10 stores instructions for execution by the processor 20 in the form of software for creating a digital image file from a captured image. In an example embodiment, the camera module 36 may further comprise a processing element such as a co-processor that assists the processor 20 in processing image data and an encoder and/or decoder for compressing and/or decompressing image data. The encoder and/or decoder may encode and/or decode according to a standard format, for example, a Joint Photographic Experts Group (JPEG) standard format.

The electronic device 10 may comprise one or more user identity modules (UIM) 38. The UIM may comprise information stored in memory of electronic device 10, a part of electronic device 10, a device coupled with electronic device 10, and/or the like. The UIM 38 may comprise a memory device having a built-in processor. The UIM 38 may comprise, for example, a subscriber identity module (SIM), a universal integrated circuit card (UICC), a universal subscriber identity module (USIM), a removable user identity module (R-UIM), and/or the like. The UIM 38 may store information elements related to a subscriber, an operator, a user account, and/or the like. For example, UIM 38 may store subscriber information, message information, contact information, security information, program information, and/or the like. Usage of one or more UIM 38 may be enabled and/or disabled. For example, electronic device 10 may enable usage of a first UIM and disable usage of a second UIM.

In an example embodiment, electronic device 10 comprises a single UIM 38. In such an embodiment, at least part of subscriber information may be stored on the UIM 38.

In another example embodiment, electronic device 10 comprises a plurality of UIM 38. For example, electronic device 10 may comprise two UIM 38 blocks. In such an example, electronic device 10 may utilize part of subscriber information of a first UIM 38 under some circumstances and part of subscriber information of a second UIM 38 under other circumstances. For example, electronic device 10 may enable usage of the first UIM 38 and disable usage of the second UIM 38. In another example, electronic device 10 may disable usage of the first UIM 38 and enable usage of the second UIM 38. In still another example, electronic device 10 may utilize subscriber information from the first UIM 38 and the second UIM 38.

Electronic device 10 may comprise a memory device including, in one embodiment, volatile memory 40, such as volatile Random Access Memory (RAM) including a cache area for the temporary storage of data. The electronic device 10 may also comprise other memory, for example, non-volatile memory 42, which may be embedded and/or may be removable. The non-volatile memory 42 may comprise an EEPROM, flash memory or the like. The memories may store any of a number of pieces of information, and data. The information and data may be used by the electronic device 10 to implement one or more functions of the electronic device 10, such as the functions described in conjunction with FIGS. 1-8. For example, the memories may comprise an identifier, such as an international mobile equipment identification (IMEI) code, which may uniquely identify the electronic device 10.

Electronic device 10 may comprise one or more sensor 37. Sensor 37 may comprise a light sensor, a proximity sensor, a motion sensor, a location sensor, and/or the like. For example, sensor 37 may comprise one or more light sensors at various locations on the device. In such an example, sensor 37 may provide sensor information indicating an amount of light perceived by one or more light sensors. Such light sensors may comprise a photovoltaic element, a photoresistive element, a charge coupled device (CCD), and/or the like. In another example, sensor 37 may comprise one or more proximity sensors at various locations on the device. In such an example, sensor 37 may provide sensor information indicating proximity of an object, a user, a part of a user, and/or the like, to the one or more proximity sensors. Such proximity sensors may comprise capacitive measurement, sonar measurement, radar measurement, and/or the like.

Although FIG. 8 illustrates an example of an electronic device that may utilize embodiments of the invention including those described and depicted, for example, in FIGS. 1-8, electronic device 10 of FIG. 8 is merely an example of a device that may utilize embodiments of the invention.

Embodiments of the invention may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media. In the context of this document, a "computer-readable medium" may be any tangible media or means that can contain, or store the instructions for use by or in connection with an instruction execution system, apparatus, or device, such as a computer, with one example of a computer described and depicted in FIG. 8. A computer-readable medium may comprise a computer-readable storage medium that may be any tangible media or means that can contain or store the instructions for use by or in connection with an instruction execution system, apparatus, or device, such as a computer.

If desired, the different functions discussed herein may be performed in a different order and/or concurrently with each other. For example, block 503 of FIG. 5 may be performed after block 504. In another example, block 612 of FIG. 6 may be performed before block 610. Furthermore, if desired, one or more of the above-described functions may be optional or may be combined. For example, blocks 606, and 609-614 of FIG. 6 may be optional or combined with block 615.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. An apparatus, comprising:
a processor;
memory including computer program code, the memory and the computer program code configured to, working with the processor, cause the apparatus to perform at least the following:
terminate display of a cursor based, at least in part, on absence of a touch input that comprises a cursor mode initiation input;
receive, subsequent to the termination of display of the cursor, an indication of a continuous stroke input associated with a contact region of a touch display, the continuous stroke input being the touch input that comprises at least a contact input, a movement input, and a release input, the continuous stroke input being indicative of continuous contact with the touch display between the contact input and the release input;
determine whether to display the cursor depending on the contact input being the cursor mode initiation input, wherein the cursor mode initiation input is an entering touch display boundary input;
cause display of the cursor in response to determining that the contact input is the cursor mode initiation input;
cause the cursor to be offset from the contact region when the cursor is displayed;
cause the cursor to move so that the cursor remains offset from the contact region in response to the movement input when the cursor is displayed; and
determine an operation based, at least in part, on a position of at least part of the cursor when the cursor is displayed.

2. The apparatus of claim 1, wherein the apparatus performs the determination of the operation in response to receiving indication of a key press, and the determination of the operation is further based, at least in part, on duration of the key press.

3. The apparatus of claim 1, wherein the memory and the computer program code are further configured to, working with the processor, cause the apparatus to cause termination of display of the cursor in response to the release input.

4. The apparatus of claim 1, wherein determining that the contact input is a cursor mode initiation input further comprises determining that the touch display boundary input relates to a left boundary of the touch display.

5. The apparatus of claim 1, wherein the memory and the computer program code are further configured to, working with the processor, cause the apparatus to cause display of at least one graphical representation of a button.

6. The apparatus of claim 5, wherein the memory and the computer program code are further configured to, working with the processor, cause the apparatus to receive indication of a separate concurrent touch input that corresponds with position of the graphical representation of the button wherein the determination of the operation is performed in response to receiving indication of the separate concurrent touch input.

7. The apparatus of claim 6, wherein the determination of the operation is further based, at least in part, on duration of the indication of the separate concurrent touch input.

8. The apparatus of claim 5, wherein the causing display of the at least one graphical representation is performed in response to determining that position of, at least part of, the cursor corresponds to an information item.

9. The apparatus of claim 5, wherein the at least one graphical representation comprises indication of an operation associated with an information item that corresponds to position of, at least part of, the cursor.

10. The apparatus of claim 5, wherein a number of the at least one graphical representation caused to be displayed is based at least in part on an information item that corresponds to position of, at least part of, the cursor.

11. The apparatus of claim 1, wherein the memory and the computer program code are further configured to, working with the processor, cause the apparatus to receive indication of a separate concurrent touch input.

12. The apparatus of claim 11, wherein the memory and the computer program code are further configured to, working with the processor, cause the apparatus to perform a zoom operation in response to determining that the indication of the separate concurrent touch input relates to the zoom operation.

13. The apparatus of claim 11, wherein the memory and the computer program code are further configured to, working with the processor, cause the apparatus to perform a pan operation in response to determining that the indication of the separate concurrent touch input relates to the pan operation.

14. The apparatus of claim 1, wherein the continuous stroke input further comprises a heavy press input and the determination of the operation is performed in response to the heavy press input.

15. The apparatus of claim 1, wherein the apparatus comprises the touch display, and the indication of the continuous stroke input is received by way of the touch display.

16. The apparatus of claim 1, wherein the memory and the computer program code are further configured to, working with the processor, cause the apparatus to perform at least the following:
terminate display of the cursor in response to the release input;
receive, subsequent to the termination of display of the cursor, an indication of a second continuous stroke input associated with the contact region of the touch display, the second continuous stroke input being another touch input that comprises at least another contact input and another release input, the second continuous stroke input being indicative of continuous contact with the touch display between the other contact input and the other release input;
determine that the other contact input is not the cursor mode initiation input based at least in part on a position of the other contact input;
in response to determining that the other contact input is not the cursor mode initiation input, terminate display of the cursor.

17. The apparatus of claim 1, wherein the entering touch display boundary input is an input in which contact with the touch display is beyond a boundary of the touch display and the movement associated with the contact crosses the boundary of the touch display.

18. A method, comprising:
terminating display of a cursor based, at least in part, on absence of a touch input that comprises a cursor mode initiation input;
receiving, subsequent to the termination of display of the cursor, an indication of a continuous stroke input associated with a contact region of a touch display, the continuous stroke input being the touch input that comprises at least a contact input, a movement input, and a release input, the continuous stroke input being indicative of continuous contact with the touch display between the contact input and the release input;
determining whether to display the cursor depending on the contact input being the cursor mode initiation input, wherein the cursor mode initiation input is an entering touch display boundary input;
causing display of the cursor in response to determining that the contact input is the cursor mode initiation input;
causing the cursor to be offset from the contact region when the cursor is displayed;
causing the cursor to move so that the cursor remains offset from the contact region in response to the movement input when the cursor is displayed; and
determining, by a processor, an operation based, at least in part, on a position of at least part of the cursor when the cursor is displayed.

19. A non-transitory computer-readable medium encoded with instructions that, when executed by a computer, perform:
terminating display of a cursor based, at least in part, on absence of a touch input that comprises a cursor mode initiation input;
receiving, subsequent to the termination of display of the cursor, an indication of a continuous stroke input associated with a contact region of a touch display, the continuous stroke input being the touch input that comprises at least a contact input, a movement input, and a release input, the continuous stroke input being indicative of continuous contact with the touch display between the contact input and the release input;
determining whether to display the cursor depending on the contact input being the cursor mode initiation input, wherein the cursor mode initiation input is an entering touch display boundary input;
causing display of the cursor in response to determining that the contact input is the cursor mode initiation input;
causing the cursor to be offset from the contact region when the cursor is displayed;
causing the cursor to move so that the cursor remains offset from the contact region in response to the movement input when the cursor is displayed; and
determining, by a processor, an operation based, at least in part, on a position of at least part of the cursor when the cursor is displayed.

* * * * *